United States Patent [19]
Thompson et al.
[11] Patent Number: 4,822,448
[45] Date of Patent: Apr. 18, 1989

[54] FABRIC BAND MAKING AND LABEL APPLYING MACHINE

[76] Inventors: Kenneth J. Thompson, Rte. 3, Box 268, Lexington, N.C. 27292; Wayne G. Foster, 101 Forest Dr., Advance, N.C. 27006; Joel C. Rosenquist, 9430 Morton Dr., Kernersville, N.C. 27284; David S. Ketner, 3212 Dillon Rd., Jamestown, N.C. 27282

[21] Appl. No.: 44,063

[22] Filed: Apr. 29, 1987

[51] Int. Cl.[4] .............................................. B65G 57/16
[52] U.S. Cl. ................................ 156/538; 198/487.1; 414/225; 414/27
[58] Field of Search ................ 156/538; 414/222, 225, 414/908, 744 R, 744 A, 27; 294/103.1, 103.2, 104; 198/487.1

[56] References Cited

U.S. PATENT DOCUMENTS

| | | | |
|---|---|---|---|
| 2,864,138 | 12/1958 | Pierce et al. | 198/487.1 X |
| 3,195,444 | 7/1965 | McLean | 414/27 X |
| 3,217,901 | 11/1965 | Rise | 414/744 A X |
| 3,240,356 | 3/1966 | Hill | 414/27 |
| 3,705,562 | 12/1972 | Hanyu et al. | 112/232 |
| 3,780,679 | 12/1973 | Hanes, Jr. et al. | 112/121.27 |
| 3,884,369 | 5/1975 | Tomlinson | 214/8 |
| 3,949,688 | 4/1976 | Andersson | 112/121.26 |
| 4,311,031 | 1/1982 | Schwarze | 414/225 X |
| 4,503,790 | 3/1985 | Keeton | 112/121.27 |
| 4,527,493 | 7/1985 | Sallee et al. | 112/121.27 |
| 4,588,070 | 5/1986 | Smith | 294/104 X |

*Primary Examiner*—David Simmons

[57] ABSTRACT

An apparatus for securing the free ends of an elongated strip of flexible material to form a band, such as an elastic band, for various types of apparel. The machine includes a securing station, such as a sewing station including a sewing machine, and an apparatus for drawing a strip of flexible material longitudinally beneath the securing station in a measuring path. An adjustable measuring device deflects a predetermined length of the strip downward away from the measuring path to form a measured open loop. A knife mechanism cuts the trailing end portion of the loop. Loading and clamping mechanisms position the free ends of the loop in the securing station for attachment, such as by stitching. An extraction and transfer mechanism withdraws the finished loop from the sewing station and transfers it to a label application station. The label application station includes upper and lower heat platens between which a portion of the loop is placed for heat sealing a label or the like thereon. A pivotally mounted kick-off assembly partially embraces the lower heat platen for moving the just labeled loop therefrom and on to a carousel-type receiving and accumulating mechanism therebelow.

21 Claims, 4 Drawing Sheets

FABRIC BAND MAKING AND LABEL APPLYING MACHINE

BACKGROUND OF THE INVENTION

This invention relates to an apparatus for making flexible bands, and particularly elastic fabric bands for use in the manufacture of apparel, in which a strip of fabric material is measured and cut and the free ends sewn together to form a loop.

The prior art, particularly the patent to Sallee et al., U.S. Pat. No. 4,527,493 dated July 9, 1985, discloses the concept of feeding an elongated strip of fabric material beneath a sewing machine, subsequently deflecting a portion of the strip beneath the sewing machine to form a measured loop, clamping the end portions, cutting the trailing end portion of the deflected loop, placing the trailing and leading ends of the loop upon the sewing machine work plate, and subsequently stitching the overlapping ends of the loop together and ejecting the completed loop.

Other prior art devices for producing elastic loops or bands for apparel are disclosed in U.S. Pat. Nos. 3,705,562; 3,780,679; and 3,949,688. These devices are limited to forming the band with no provisions for placing a label or the like therein in the manner herein disclosed.

SUMMARY OF THE INVENTION

It is an object of the present invention to improve the prior art machines, particularly the one noted above (U.S. Pat. No. 4,527,493) by providing the same with an attachment for removing the completed loop or band from the sewing machine and transferring the same to a label application station at which a label is attached thereto and the same is ejected to a multiple fingered carousel located therebelow where they are accumulated in a completely automated manner. A control system, which forms no part of the present invention apart from completing the disclosure and a clear understanding of the invention, is provided to control the various operational movements in a sequential and automatic manner. A further object of the present invention is to eliminate the need to manually transfer accumutated loops to a labeling machine elsewhere.

DESCRIPTION OF THE PREFERRED EMBODIMENT

Figure 1:
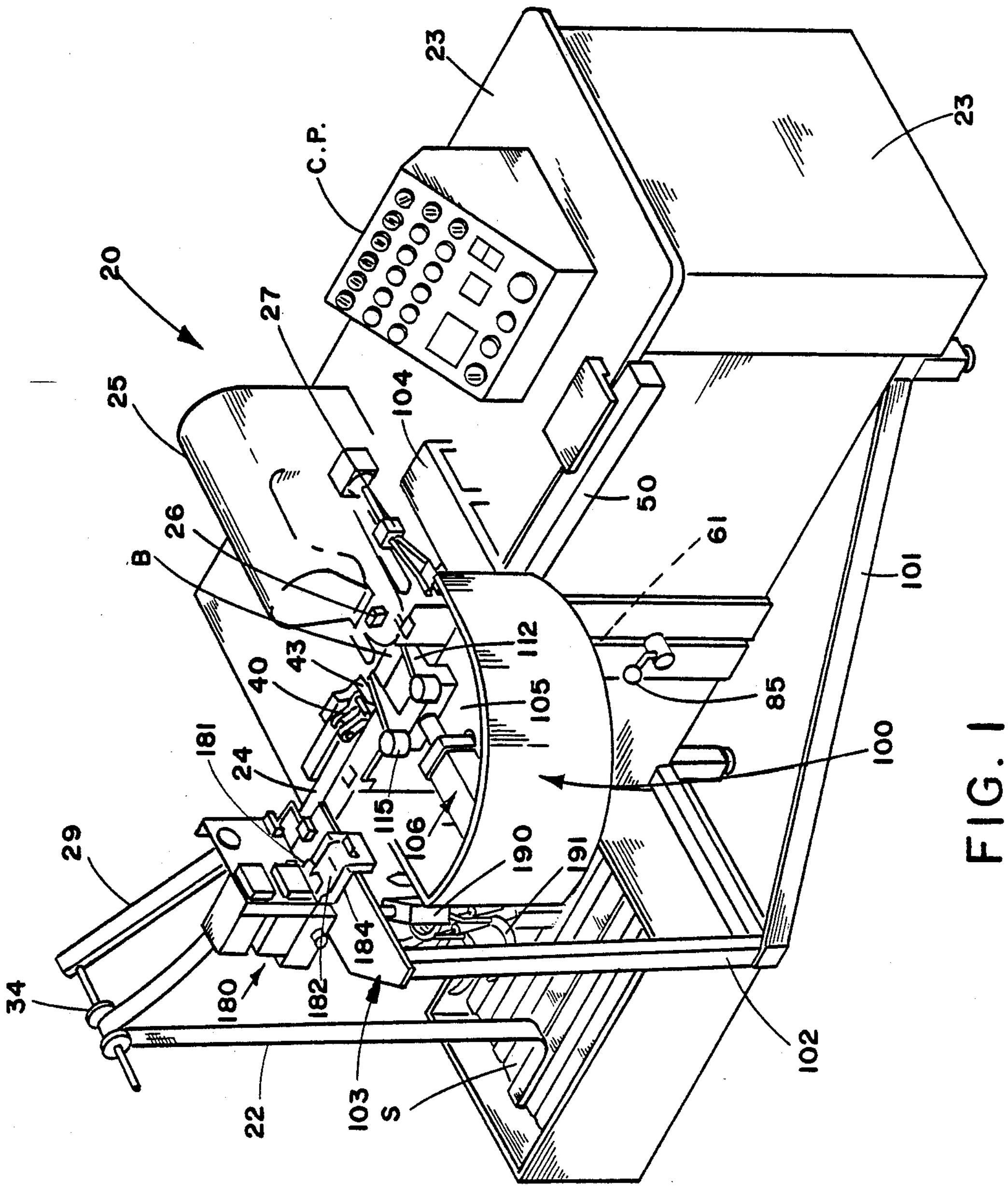
FIG. 1 is a perspective view of the entire system including the present invention attached to the prior art machine.
Figure 2:
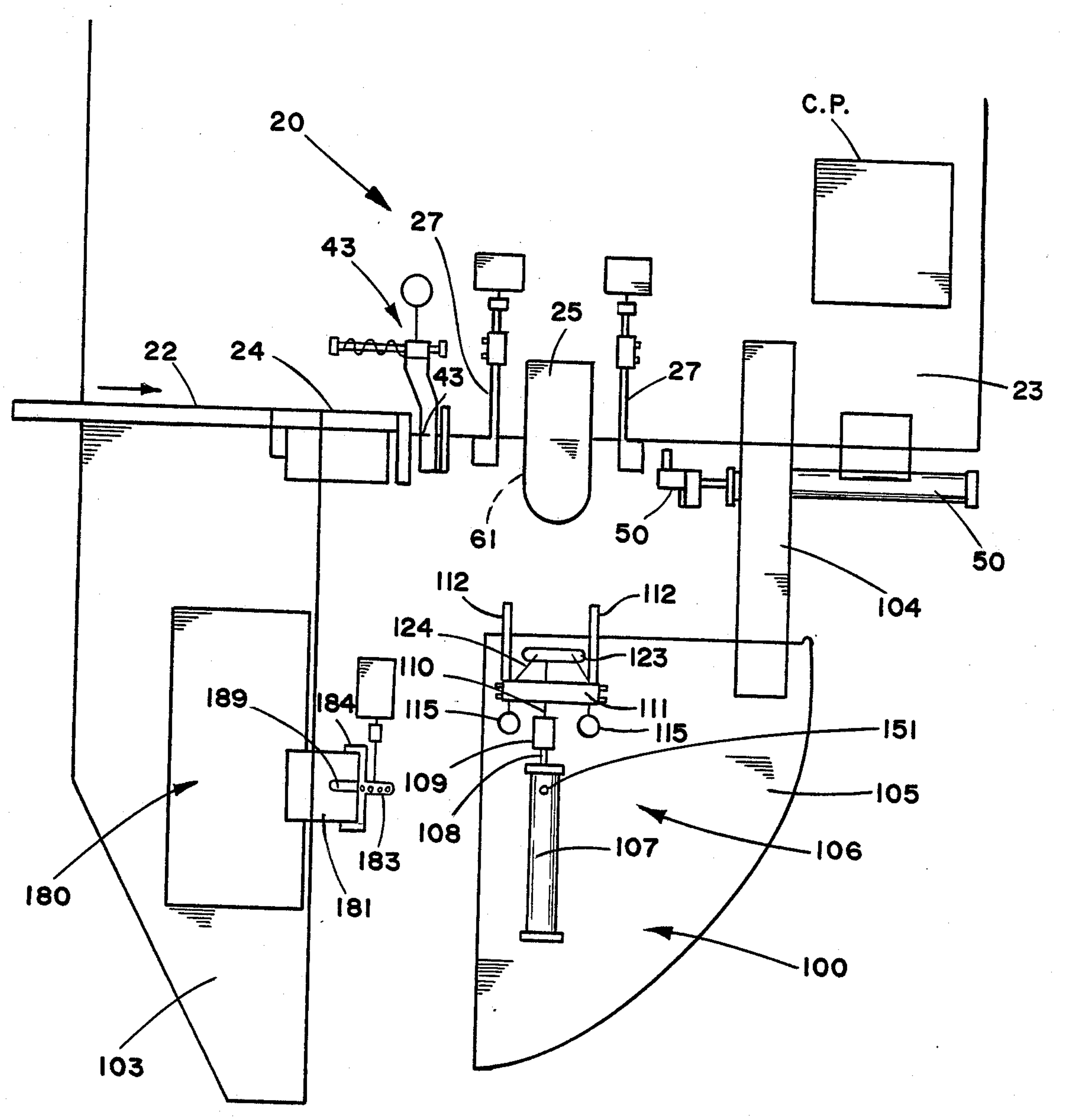
FIG. 2 is a top view of the system shown in FIG. 1.

Referring now to the drawing in more detail, FIGS. 1 and 2 broadly show the entire system for making a flexible band or loop as shown in the prior art U.S. Pat. No. 4,527,493 to Sallee et al. and the improvement depicting the present invention as employed therewith. The disclosure of the above noted prior art patent is herein incorporated by reference. Briefly, as shown in FIGS. 1 and 2, a supply S of material 22 is provided to be fed to the processing area. This supply could take the form of a roll, a container with the material folded upon itself, or any other convenient supply source. The material is trained over a bar, roller or the like 34 attached to an arm 29 and to a guide surface or feed track 24 under a holding pawl arrangement 43 and a sewing machine 25. Clamps 27 are arranged on each side of the sewing head to position the ends of the material 22 to be sewn. A pull clamp device 50 is employed to grasp the end of the material 22 and move the same to the processing area where it is measured by device 61 and cut to length by cutter 43 with the cuts ends positioned at the sewing machine in the stitching area. This is all shown in the prior art patent to Sallee et al. U.S. Pat. No. 4,527,493.

Our invention generally indicated at 100 in FIG. 1 and 2 is attached to the prior art device 20 by any suitable rigid frame members 101, 102, 103, and 104. Rigidly attached to the frame members is a transfer platform 105 which supports a transfer mechanism generally indicated at 106, FIGS. 1, 2, 5, and 6, and a deflecting mechanism 160, FIG. 5 and 7. The transfer mechanism 106 is located at a position facing the sewing machine 25, FIGS. 1 and 2, and includes a reciprocating fluid motor 107 having a piston rod 108 to which is attached a smaller fluid motor having a cylinder 110 attached to rod 108 by a connection 109; cylinder 110 has affixed thereto a yoke arrangement 111. Yoke arrangement 111 has attached thereto laterally spaced band or loop gripping means 112, FIGS. 5 and 6. Each gripping means includes upper pivotally mounted and lower fixed finger-like members 113, 114, respectively, which are opened and closed by small fluid motors 115 supplied with fluid pressure via connections 116. The upper fingers 113 are pivotally attached to yoke 111 at 117 and to the upper ends of cylinders 115 by pivot 118. Cylinders 115 are attached to the yoke by members 119, 120. As pointed out above, yoke 111 is affixed to cylinder 110 and furhter includes toggle 121 attached thereto and defines an arrangement to slightly move gripping means 112, 112 toward and away from each other, the purpose of which will be explained subsequently. Extending through yoke 111 is the piston 122 of cylinder 110 which has a small yoke 123 of toggle arrangement 121 attached to the end thereof, the yoke having levers 124 operatively connected thereto and to gripping means 112 which are slidably mounted in yoke 111 upon movement of rod 122. Note that the cylinder 110 supports yoke 111 and piston 122 is free to move therethrough.

Figure 8:
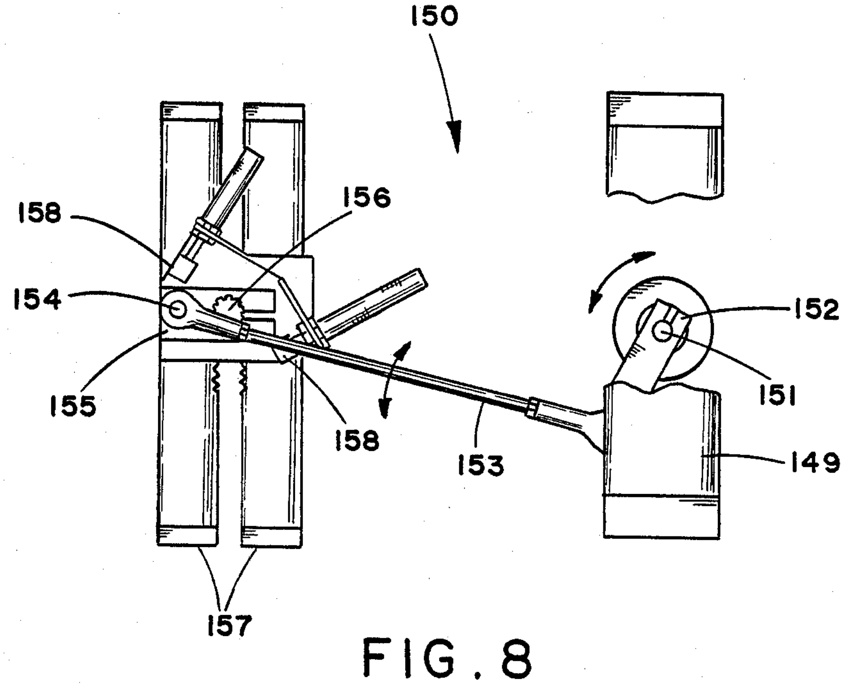
FIG. 8 is a view with parts broken away of the transfer actuating device.

As previously pointed out, transfer mechanism 106 moves approximately 90° from a position facing the stitching or sewing area to a labeling area to transfer the loop or band to be labeled. The mechanism to accomplish this operation is illustrated generally at 150 in FIGS. 5 and 8 and is attached at 149 to the lower or bottom surface of platform 105. Passing freely through platform 105 is a support rod or hte like 151 rigidly attached to and firmly supporting the transfer device 106, suitable bearings being provided to allow free rotation. Attached to support rod 151 is a crank arm 152 which in turn is connected to pitman rod or the like 153 which in turn is pivoted at 154 to another crank arm 155 rigidly attached to an intermittently driven shaft 156 having gear teeth thereon defining pinion means in engagement with gear teeth on racks 157 which can be driven by fluid motors or any other convenient drive means. Mounted adjacent to and laterally spaced from each other are adjustable stops 158 which are operatively associated with the rack drive means to control rotation of the shaft 156 and through pitman rod 153 and crank arm 152 the pivotal movement of transfer device 106 between sewing station and the labeling station.

Figure 5:
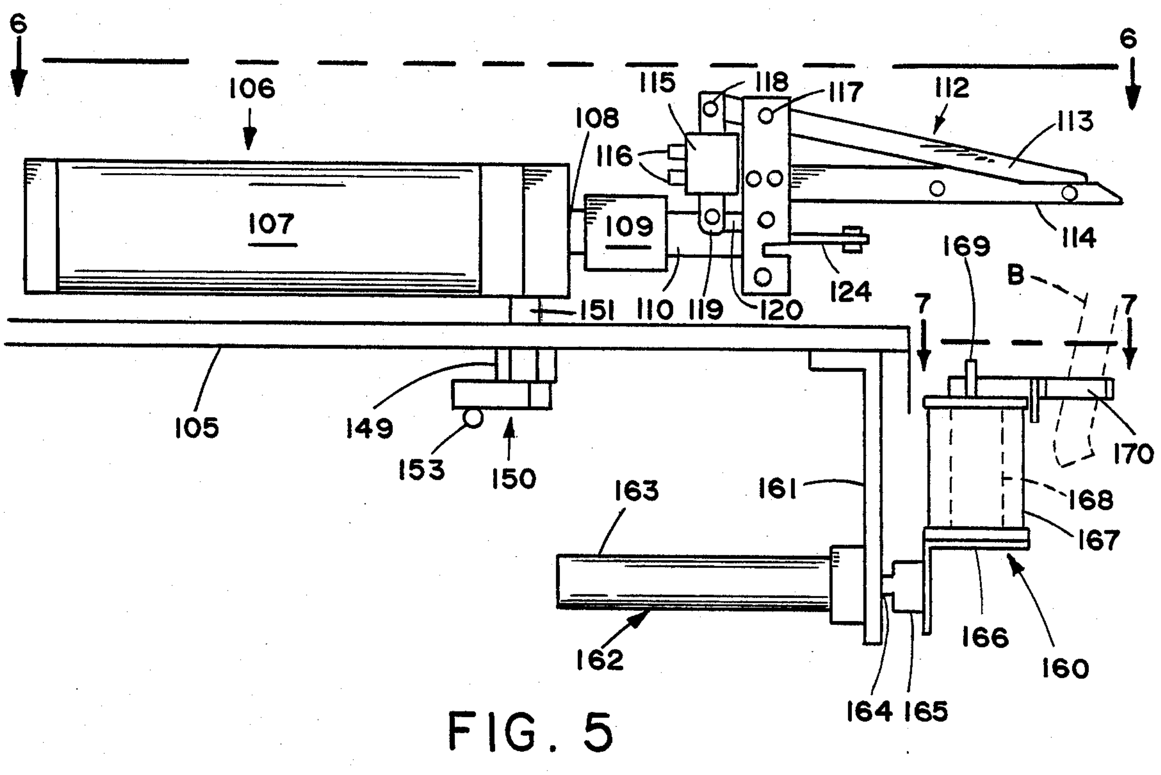
FIG. 5 is a side elevation of the transfer device and the loop deflecting or extraction device.
Figure 6:
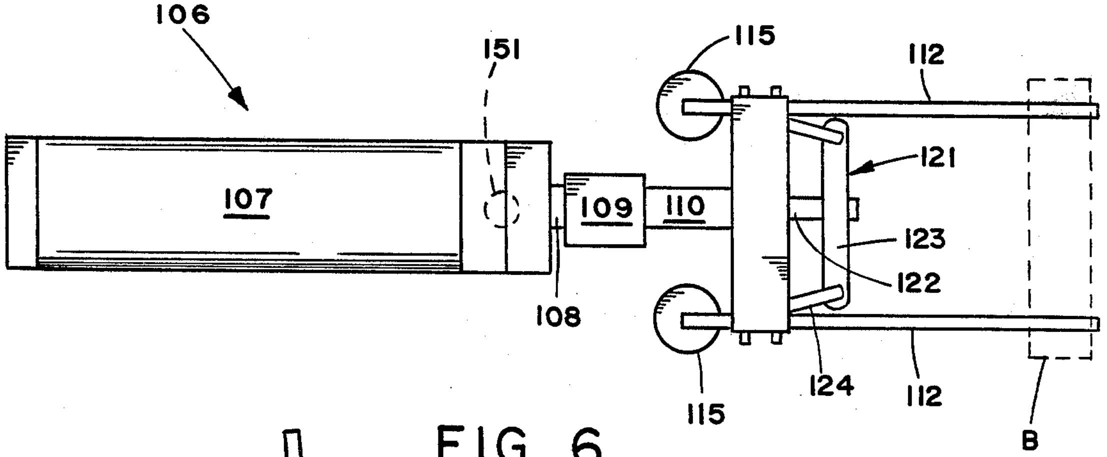
FIG. 6 is a top view of the transfer device taken along 6—6 of FIG. 5.
Figure 7:
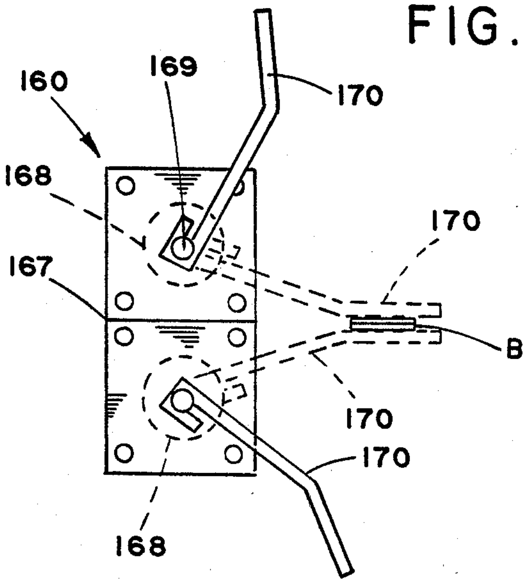
FIG. 7 is a top view of the loop deflector taken along line 7—7 of FIG. 5.

Also, attached to and depending from the bottom of platform 105 is a loop deflecting mechanism generally at 160, FIGS. 5 and 7. This mechanism is attached to a depending plate-like support 161 rigidly attached by any convenient means to platform 105, supporting double-acting reciprocating fluid motor 162 having its cylinder rigidly fixed to support 161 and its piston rod 164 extending freely therethrough. Attached to the free end 165 of rod 164 is an elongated inverted L-shaped support 166 which supports vertically extending housing 167 in which are mounted conventional rotary fluid motors or cylinders 168. Each motor has a rod or shaft 169 extending through the upper surface of support 167 rotatably supported by conventional bearings and each shaft having rigidly attached loop or band grippers 170, FIG. 7, movable from an open position, as shown in solid lines, to closed position, as shown in broken lines, to grip or grasp loop or band B.

Figure 3:
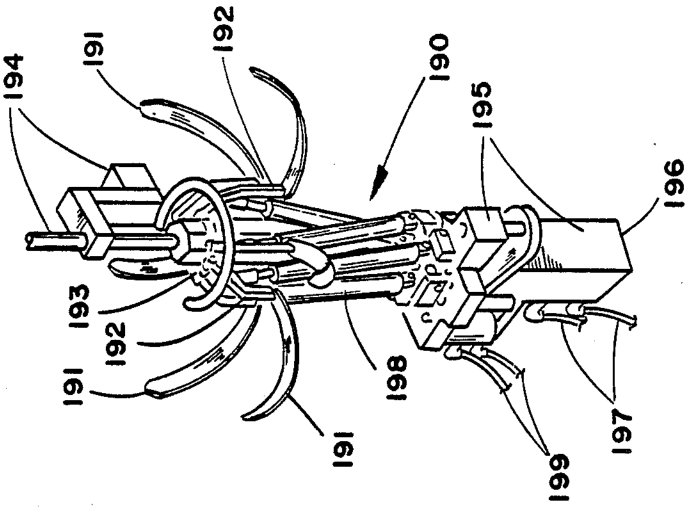
FIG. 3 is a side elevation of the carousel type finished band or loop accumulating device.
Figure 4:
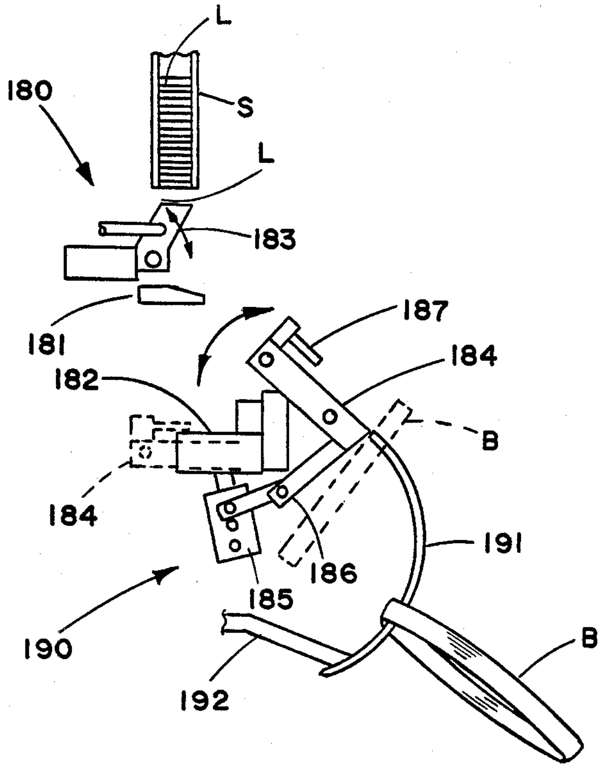
FIG. 4 is a fragmentary side elevation of the labeling device, ejector and an accumulating finger in its receiving position and completed loop thereon.

Illustrated in FIGS. 3 and 4 is a labeling and an accumulating station which is a very important novel feature of the invention having to do with the handling of the completed loop or band just prior to, during, and after the label is attached thereto. Broadly illustrated at 180 in FIGS. 1, 2, and 4 is a conventional heat sealing arrangement which, in brief, includes an upper heat platen 181, a lower heat platen 182 and a vacuum finger 183 which removes a label L from a supply S-1 and places it on the band and lower platen 182. As shown in FIG. 2, upper platen 181 has a slot 189 therein to permit finger 183 (note the angle thereof) to pass therethrough to place the label between the platens to heat-seal the same to the loop or band. Partially embracing lower platen 182 is an ejector or kick-off assembly 184 having an actuating fluid motor 185 and the necessary linkage 186 for moving same from a substantially horizontal position to the inclined ejection position illustrated in FIG. 4. Spaced slightly above loop or band engaging portions of ejection or kick-off assembly are slightly elongated restraining pins 187 under which the loop is positioned during sealing.

Positioned below the labeling station and rigidly attached to the under surface of frame member 103 is the novel loop or accumulating device generally indicated at 190, FIGS. 1, 3, and 4. The accumulator, best illustrated in FIG. 3, is in the form of an indexical carousel having a plurality of generally upwardly and outwardly extending arcuate shaped accumulators or fingers 191 attached to a first end of angled arms 192 which are pivoted at the other end thereof to a vertically oriented support 194. Support 194 has at its lower end rotatable support structure 195 with suitable bearings mounting the same and has mounted therein rotary indexing fluid motor and housing means. Fluid lines 197 supply the fluid pressure for indexing the carousel. Also, support 195 pivotally mounts the lower or cylinder ends of double-acting fluid motors 198, one being provided for each accumulator finger 191 and the upper or rod end being attached to the arms 192 intermediate the ends thereof, these motors being supplied by fluid lines 199. It should be noted that the carousel 190 is so positioned with respect to the labeling device that the ends of the fingers of the accumulators, when actuated, move to the position shown in FIG. 4 to receive the labeled bands B removed from lower platen 182 by ejector or kick-off assembly 184. The individual accumulator fingers 191 are designed to accumulate up to several dozen finished bands B. The actual number is controlled by a conventional program and control system, and when a predetermined number is reached, the carousel is automatically indexed to move an empty finger in place to receive finished bands. While the drawings show six accumulating fingers, any number could be provided without departing from the scope of the invention. With this arrangement, an operator could unload the filled fingers without interrupting the operation of the system.

The operation of the system up to forming the bands is known in the art, as previously pointed out. The operation of our contribution to the art begins with the handling of the band during and after the sewing or stitching operation and is as follows: as the measuring is being completed, deflector 160 with grippers 170 is in the open position, FIG. 7, and moved to the right by fluid motor 162 to position grippers 170 on each side of the measured band. Note that the band has been deflected downwardly as shown at 61, 62, and 66, FIG. 1, of U.S. Pat. No. 4,527,493 noted above. At this time rotary motors 168 rotate the gripping arms 170 to the broken line position of FIG. 7 to grip the now measured band, and at this time fluid motor 163 retracts the now gripped band to deflect the same out of the paths of the previously mentioned measuring device 61 and the pull clamp device 50 so they can continue their continuous and automatic operation. It should be noted that while the band is being deflected, the sewing machine clamps the area being stitched in such a manner as to prevent the deflecting of the lower part of the loop from interfering with the stitching process. Upon the completion of the stitching operation, the clamps are opened and the loop or band is released so it can be transferred to a labeling station.

While the station operation is being performed, transfer mechanism 106 is set into operation as follows: reciprocating motor 107 FIGS. 1, 2, 5, and 6 is actuated to move the transfer head to a position wherein gripping members 112, 113, 114, which have now been opened by fluid motor 115, are located on each side of the stitching head of the sewing machine 25 with spaced portions of the band located between grippers to grasp the band. Upon or during completion of the stitching operation, toggle linkage 121 is actuated to move grippers 112 laterally to slightly stretch or tense the portion of the band located therebetween. This can be done, as stated above, during the stitching, since the sewing area is tightly clamped during such stitching or subsequent thereto. Upon completion of the stitching, transfer device 106 is retracted to its original position with the grasped and stretched loop or band held thereby. At this time, transfer device 106 is retracted to its original position with the grasped and stretched loop or band held thereby. At this time, transfer device is rotated to the labeling station approximately 90° by drive mechanism 150 from the sewing station, and on arrival at the labeling station, the transfer device 106 is extended to present the stretched or tensed area of the loop to lower heat platen 182. While in a stretched or tensed condition and located on lower platen 182, label placing device 183 and upper platen 181 are moved downwardly, placing a label on the band and heat sealing the same. At this time, the jaws of the gripping device are opened and moved laterally back to the original position, and the entire head is retracted and rotated back to the original position facing the sewing station. Upon the completion of the sealing, ejector or kick-off assembly 184 moves to the solid line position shown in FIG. 4 to cause band B to be moved to just arrived accumulator finger 191 which is so coordinated with the leaving of transfer device 106 and to kick-off device 184 as to permit smooth, uninterrupted operation. After receiving the just labeled band, finger 191 is returned to its original or at rest position awaiting another labeled loop or band.

The controls for the sequential steps of the various mechanisms are of a conventional type and they may include timer motor, timer switches and/or limit switches at appropriate locations, tape programs, counters, light sensitive switches, etc. necessary to fully automate the fabrication and labeling of endless elastic bands such as used in the fabrication of undergarments. The details of these controls are immaterial to the present invention apart from an understanding thereof as the novelty lies in the structural organization and operation of the several elements, subcombinations and combination as set out above.

The operation of the illustrated embodiment of the present invention as controlled from a control panel C. P. housing appropriate electric and fluid circuitry and components is well within the capabilities of one skilled in the art of circuit design and mechanical engineering.

While there has been described a preferred embodiment, it will be obvious that many modifications and alterations may be made in the various components of this device without departing from the spirit and purpose of the invention.

We claim:

1. An apparatus for use with a device having a work station for forming endless bands from strips of material by joining the ends thereof to form a closed loop or band; said apparatus comprising support means adjacent the loop forming work station; transfer means on said support for removing the formed loop or band from the work station and transferring the loop or band to a label application station for applying a label thereto; said transfer means including a reciprocation band gripping mechanism for extending into the loop forming work station, grasping the formed loop, and retracting the same to remove it from the forming station; said gripping mechanism including loop engaging jaws having means to open and close same in sequential timed relation; said transfer means including reciprocating means, said band gripping mechanism further having means to move the formed loop to a labeling station remote from the loop forming work station and placing the same on a label application device.

2. The apparatus as defined in claim 1 wherein said band or loop gripping mechanism includes a double-acting fluid motor having a rod operatively supporting the loop engaging jaws for moving same to and from the forming station.

3. The apparatus as claimed in claim 2 wherein said jaws are laterally spaced and each jaw further includes upper and lower members having means for opening and closing same to grasp laterally spaced point of the loop or band.

4. The apparatus as defined in claim 3, wherein said means for opening and closing said jaws are double-acting fluid motors.

5. The apparatus as defined in claim 4 wherein said laterally spaced jaws are mounted for limited lateral movement to stretch or tense said loop between said points and further including means to so move said jaws.

6. The apparatus as defined in claim 1 wherein the means for moving said transfer means from the forming station to the labeling station includes means to rotate same to and from said stations.

7. The apparatus as defined in claim 6 wherein said rotating means include reciprocating racks meshing with pinion means operatively connected with said transfer means.

8. The apparatus as defined in claim 1 further including a loop receiving accumulator located adjacent to and below the labeling station for receiving labeled loops discharged from said station.

9. The apparatus as defined in claim 8 wherein said accumulator is in the form of a carousel having a plurality of generally upwardly and outwardly extending substantially arcuate shaped fingers arranged around an upright support which is mounted for rotary indexing movement.

10. The apparatus as defined in claim 9 wherein the said upright support is attached to and supported by the main frame which mounts the labeling station and on the opposite side thereof.

11. The apparatus as defined in claim 10 wherein each finger is pivotally mounted at one end to said support, the other free end thereof being movable between a lower at rest position to an upper loop receiving position and including means to so position same.

12. The apparatus as defined in claim 11 wherein the means to position each finger includes a reciprocating fluid motor having one end attached thereto and the other end to a further support remote from said first end to move the end of each finger to loop receiving position adjacent the labeling station.

13. The apparatus as defined in claim 9 wherein said upright support includes a drive for indexing same when each finger has received a predetermined number of finished loops or bands thereon.

14. The apparatus as defined in claim 1 further comprising deflecting means depending from said support means and in substantial alignment with and below said transfer means to move or deflect the lower portion of the loop or band away from said forming station.

15. The apparatus as defined in claim 14 wherein said deflecting means includes a reciprocating motor, loop or band engaging gripping means and means attaching said last mentioned gripping means to said reciprocating motor.

16. The apparatus as defined in claim 15 wherein said last mentioned gripping means includes spaced apart elongated fingers having means to move same towards each other to grip the lower portion of the loop or band therebetween.

17. The apparatus as defined in claim 16 wherein said elongated fingers are mounted for rotation and include means to so rotate the same.

18. An article receiving and accumulating device comprising a generally upright indexable support member, a plurality of generally upwardly and outwardly extending article receiving finger-like members adapted to be indexed to an article loading station and moveable between a lower at rest position and an upper article receiving or loading position, actuating means attached to said finger members to move them between said positions and means to index said device to replace a loaded finger with an unloaded finger, wherein said accumulating device is in the general form of a carousel further defining means for individually pivotably mounting each finger radially about said upright support, reciprocating fluid motor means attached at one end to each of said fingers and having its other end attached to said support member whereby upon actuation thereof the fingers are moved to and from said positions.

19. The apparatus as defined in claim 18 wherein each upwardly and outwardly extending finger-like member is generally of arcuate configuration forming a cradle-like article receiving area.

20. The apparatus as defined in claim 18 wherein a stationary support frame is provided for said accumulating device and wherein means are provided to index said device relative to frame.

21. The apparatus as defined in claim 20 wherein accumulating device is rotatable and indexable and rotary fluid motor drive is provided to so index the same.

* * * * *